United States Patent
Bao

(10) Patent No.: US 12,294,618 B2
(45) Date of Patent: May 6, 2025

(54) METHOD AND APPARATUS FOR REGISTERING USER INFORMATION

(71) Applicant: DATANG MOBILE COMMUNICATIONS EQUIPMENT CO., LTD., Beijing (CN)

(72) Inventor: Chenxi Bao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/293,359

(22) PCT Filed: Jun. 16, 2022

(86) PCT No.: PCT/CN2022/099248
§ 371 (c)(1),
(2) Date: Jan. 30, 2024

(87) PCT Pub. No.: WO2023/005484
PCT Pub. Date: Feb. 2, 2023

(65) Prior Publication Data
US 2024/0275827 A1    Aug. 15, 2024

(30) Foreign Application Priority Data

Jul. 30, 2021 (CN) .......................... 202110869866.6

(51) Int. Cl.
*H04W 64/00* (2009.01)
*H04L 41/14* (2022.01)
*H04L 65/1073* (2022.01)

(52) U.S. Cl.
CPC .......... *H04L 65/1073* (2013.01); *H04L 41/14* (2013.01); *H04W 64/003* (2013.01)

(58) Field of Classification Search
CPC ... H04L 65/1073; H04L 41/14; H04W 64/003
See application file for complete search history.

(56) References Cited

U.S. PATENT DOCUMENTS

2022/0337486 A1* 10/2022 Hong .................... H04L 41/024
2023/0188424 A1*  6/2023 Xin ......................... G06N 20/00
                                                                    709/223

FOREIGN PATENT DOCUMENTS

CN        111901367  A     11/2020
CN        113169902  A      7/2021
(Continued)

OTHER PUBLICATIONS

3GPP (3GPP TSG-CT WG4 Meeting #104-e, NWDAF register into UDM, C4-213222,—May 2021.*
(Continued)

*Primary Examiner* — Lakeram Jangbahadur
(74) *Attorney, Agent, or Firm* — Kilpatrick Townsend & Stockton LLP

(57) ABSTRACT

Provided in the present application are a method and apparatus for registering user information, which are used for solving the problem of multiple pieces of registration information covering one another due to NWDAFs registering registration information of a terminal device to a UDM. The method includes a network data analytic function (NWDAF) acquiring registration information of a terminal device; and the NWDAF sending a registration request to a unified data management (UDM) function, and the registration request includes the registration information and location information, which is used for identifying a storage path of the registration information in the UDM, and the location information includes an identifier of the NWDAF.

16 Claims, 5 Drawing Sheets

(56) References Cited

FOREIGN PATENT DOCUMENTS

WO            2020224492 A1    11/2020
WO    WO-2021197773 A1 * 10/2021

OTHER PUBLICATIONS

Catt,"NWDAF register into UDM", 3GPP TSG-CT WG4 Meeting #104-e, E-Meeting, May 19-28, 2021, total 21 pages, C4-213222.
Ericsson et al., "KI #2, 11; New Sol: Solution on handling of distributed and mixed NWDAF deployments", 3GPP SA WG2 Meeting #139E, Jun. 1-12, 20201 Elbonia, total 8 pages, S2-2004527.
CATT, "NWDAF register into UDM", 3GPP TSG-CT WG4 Meeting #104-e, E-Meeting, May 19-28, 2021, total 20 pages, C4-213472.
CATT, "NWDAF register into UDM", 3GPP TSG-CT WG4 Meeting #105-e, E-Meeting, Aug. 17-27, 2021, total 24 pages, C4-214567.
European Patent Office, Extended European Search Report Issued in Application No. 22848091.9, Oct. 21, 2024, Germany, 13 pages.

* cited by examiner

METHOD AND APPARATUS FOR REGISTERING USER INFORMATION

CROSS-REFERENCE TO RELATED APPLICATIONS

The present application is a National Stage of International Application No. PCT/CN2022/099248, filed Jun. 16, 2022, which claims the priority to Chinese patent application No. 202110869866.6 filed to China National Intellectual Property Administration on Jul. 30, 2021, the entire content of which is incorporated herein by reference.

FIELD

The present application relates to the field of communication technology, in particular to a method for registering user information and apparatus.

BACKGROUND

The traditional registering way of the registration information of a terminal device is unique, that is, one network element serves for one terminal device and registers the registration information of the terminal device in a database. When the terminal device is transferred between different network elements, the old network element will transfer the registration information of the terminal device to the new network element, and the new network element will re-register or update the registration information of the terminal device into the database.

When a network data analytic function (NWDAF) serves for a terminal, the NWDAF also needs to register the registration information of the terminal device in the database. Since NWDAFs can serve for the same terminal device, when the NWDAFs register the registration information of the terminal device in the database, the registration information of the terminal device may overwrite each other.

SUMMARY

The embodiments of the present application provide a method and apparatus for registering user information, to solve the problem that registration information overwrites each other since the NWDAFs register registration information of terminal device in a unified data management (UDM).

In one embodiment of the present application provides a method for registering user information, including:
  obtaining, by a NWDAF, registration information of a terminal device; and
  sending, by the NWDAF, a registration request to a UDM; where the registration request includes the registration information and location information for identifying a storage path of the registration information in the UDM, and the location information includes an identifier of the NWDAF.

Based on the above solution, by adding the identifier of the NWDAF to the location information sent to the UDM, the information registered by different NWDAFs can be stored in different locations in the UDM, and the registration information between different NWDAFs can be prevented from overwriting each other.

In some embodiments, the location information is a uniform resource identifier (URI).

In some embodiments, the location information further includes an analytics identifier for an event, the analytics identifier for the event is used for indicating a first service performed by the NWDAF for the terminal device, and the registration information is generated when the NWDAF provides the first service for the terminal device.

Based on the above solution, the analytics identifier for the event is added to the location information, and the data corresponding to different services provided by NWDAFs for the terminal device can be stored in different locations, further preventing the registration information belonging to the same analytics identifier for the event between different NWDAFs from overwriting each other.

In some embodiments, after the NWDAF sends the registration request to the UDM, the method further includes:
  sending, by the NWDAF, an update request to the UDM in a case that the NWDAF determines that the registration information is to be updated; where the update request includes the updated registration information and the location information, and the update request is used for indicating the UDM to update the registration information in the storage path indicated by the location information to the updated registration information.

In the prior art, since the registration information of the NWDAFs uses the same location information, the update of the registration information by one NWDAF may affect the registration information of other NWDAFs. However, in the present application, the registration information of a specific NWDAF can be updated purposefully according to the identifier of the NWDAF contained in the location information, without affecting the registration information of other NWDAFs, to avoid the occurrence of update errors.

In some embodiments, after the NWDAF sends the registration request to the UDM, the method further includes:
  sending, by the NWDAF, a deletion request to the UDM in a case that the NWDAF determines that the registration information needs to be deleted; where the deletion request includes the location information, and the deletion request is used for indicating the UDM to delete the registration information in the storage path indicated by the location information.

In the prior art, since the registration information of the NWDAFs is stored in the same storage path, when the UDM deletes the registration information, the UDM may delete the registration information of the NWDAFs under the storage path. In the present application, by adding the identifier of the NWDAF to the location information, the UDM can purposefully delete the registration information of the NWDAF that sends the deletion request according to the location information, without affecting registration information of other NWDAFs, to avoid a situation of mistaken deletion.

In one embodiment of the present application provides another method for registering user information, including:
  receiving, by a UDM, a registration request from a NWDAF; where the registration request includes the registration information of the terminal device and the location information for identifying a storage path of the registration information in the UDM, and the location information includes the identifier of the NWDAF; and
  storing, by the UDM, the registration information in the storage path indicated by the location information.

In some embodiments, after the UDM stores the registration information in the storage path indicated by the location information, the method further includes:

receiving, by the UDM, an update request from the NWDAF; where the update request includes updated registration information and the location information; and updating, by the UDM, the registration information in the storage path indicated by the location information to the updated registration information according to the update request.

In some embodiments, after the UDM stores the registration information in the storage path indicated by the location information, the method further includes:

receiving, by the UDM, a deletion request from the NWDAF; where the deletion request includes the location information; and deleting, by the UDM, the registration information in the storage path indicated by the location information according to the deletion request.

In some embodiments, after the UDM stores the registration information in the storage path indicated by the location information, the method further includes:

receiving, by the UDM, a retrieval request from a NF consumer; where the retrieval request includes an identifier of first data in the registration information and the location information; and sending, by the UDM, the first data in the storage path indicated by the location information to the NF consumer.

In one embodiment of the present application provides a method for registering user information, including:

obtaining, by a first NWDAF, the registration information of the terminal device; and sending, by the first NWDAF, a registration request to UDM; where the registration request includes the registration information and location information for identifying a storage path of the registration information in the UDM; the registration information includes second data, the second data is associated with a shared storage identifier, and the shared storage identifier is used for indicating that the second data belongs to the first NWDAF; and the first NWDAF is any one of at least one of NWDAFs serving for the terminal device.

Based on the above solution, the shared storage identifier associated with the second data is used for indicating that the second data is sent by the first NWDAF, and thus the shared storage identifiers used by different NWDAFs in the present application are different, and even if the NWDAFs store the second data in the UDM, since the shared storage identifiers associated with the second data stored by different NWDAFs are different, the situation that the data overwrites each other can be avoided.

In some embodiments, the location information is a uniform resource identifier (URI).

In some embodiments, the registration information further includes third data, the third data is not associated with the shared storage identifier to indicate that the third data is stored in the storage path indicated by the location information.

In some embodiments, after the first NWDAF sends a registration request to the UDM, the method further includes:

sending, by the first NWDAF, an update request to the UDM in a case that the first NWDAF determines that the second data is updated; where the update request includes the updated second data, the shared storage identifier associated with the second data, and the Location information; and the update request is used for indicating the UDM to update the second data in the storage path indicated by the location information to the updated second data.

Based on the above solution, since the update request sent by the first NWDAF to the UDM may carry the shared storage identifier associated with the second data, it can be indicated that the second data that needs to be updated is the second data stored by the first NWDAF. After receiving the update request, the UDM will update the second data previously stored by the first NWDAF, and will not update the second data stored by other NWDAFs serving for the terminal device. In this way, the occurrence of an update error can be avoided.

In some embodiments, after the first NWDAF sends a registration request to the UDM, the method further includes:

sending, by the first NWDAF, a deletion request to the UDM in a case that the first NWDAF determines that the second data needs to be deleted; where the deletion request includes the identifier of the second data, the shared storage identifier associated with the second data, and the location information; and the deletion request is used for indicating the UDM to delete the second data in the storage path indicated by the location information.

Based on the above solution, since the shared storage identifiers used by different NWDAFs are different, when the first NWDAF sends a deletion request to the UDM, the UDM may delete the data stored by the first NWDAF according to the shared storage identifier used by the first NWDAF, to avoid the occurrence of mistaken deletion.

In one embodiment of the present application provides another method for registering user information, including:

receiving, by the UDM, a registration request from the first NWDAF; where the registration request includes the registration information of the terminal device and the location information for identifying the storage path of the registration information in the UDM; the registration information is obtained by the NWDAF during the process of registering the terminal device to the core network; the registration information includes second data, the second data is associated with a shared storage identifier, and the shared storage identifier is used for indicating that the second data belongs to the first NWDAF; and the first NWDAF is any one of at least one of NWDAFs serving for the terminal device; and storing, by the UDM, the second data in the storage path indicated by the location information.

In some embodiments, after the UDM stores the second data in the storage path indicated by the location information, the method further includes:

receiving, by the UDM, an update request from the first NWDAF; where the update request includes the updated second data, the shared storage identifier associated with the second data, and the location information; and updating, by the UDM, the second data in the storage path indicated by the location information to the updated second data.

In some embodiments, after the UDM stores the second data in the storage path indicated by the location information, the method further includes:

receiving, by the UDM, a deletion request from the first NWDAF; where the deletion request includes the identifier of the second data, the shared storage identifier associated with the second data, and the location information; and deleting, by the UDM, the second data in the storage path indicated by the location information.

In some embodiments, after the UDM stores the registration information in the storage path indicated by the location information, the method further includes:

receiving, by the UDM, a retrieval request from a NF consumer; where the retrieval request includes the identifier of the first data included in the registration information and the location information; and sending, by the UDM, the first data in the storage path indicated by the location information to the NF consumer.

In one embodiment of the present application provides a communication system, including:

a NWDAF, configured to obtain the registration information of the terminal device; where the NWDAF is further configured to send a registration request to the UDM; the registration request includes the registration information and location information for identifying the storage path of the registration information in the UDM; and the location information includes the identifier of the NWDAF; and a UDM, configured to store the registration information in the storage path indicated by the location information.

In some embodiments, after the UDM stores the registration information in the storage path indicated by the location information, the NWDAF is further configured to send an update request to the UDM when the NWDAF determines that the registration information is to be updated; where the update request includes updated registration information and the location information; and the UDM is further configured to update the registration information in the storage path indicated by the location information to the updated registration information.

In some embodiments, after the UDM stores the registration information in the storage path indicated by the location information, the NWDAF is further configured to send a deletion request to the UDM when the NWDAF determines that the registration information needs to be deleted; where the deletion request includes the location information; and the UDM is further configured to delete the registration information in the storage path indicated by the location information.

In tone embodiment of the present application provides another communication system, including:

a first NWDAF, configured to obtain the registration information of the terminal device; where the first NWDAF is further configured to send a registration request to the UDM; where the registration request includes the registration information and location information for identifying the storage path of the registration information in the UDM; the registration information includes second data, the second data is associated with a shared storage identifier, and the shared storage identifier is used for indicating that the second data belongs to the first NWDAF; and the first NWDAF is any one of at least one of NWDAFs serving for the terminal device; and a UDM, configured to store the second data in the storage path indicated by the location information.

In some embodiments, after the UDM stores the second data in the storage path indicated by the location information, the first NWDAF is further configured to send an update request to the UDM when the first NWDAF determines that the second data is updated; where the update request includes the updated second data, the shared storage identifier associated with the second data, and the location information; and the UDM is further configured to update the second data in the storage path indicated by the location information to the updated second data.

In some embodiments, after the UDM stores the second data in the storage path indicated by the location information, the first NWDAF is further configured to send a deletion request to the UDM when the first NWDAF determines that the second data needs to be deleted; where the deletion request includes the identifier of the second data, the shared storage identifier associated with the second data, and the location information; and the UDM is further configured to delete the second data in the storage path indicated by the location information.

In some embodiments, the system further includes a NF consumer; where after the UDM stores the second data in the storage path indicated by the location information, the NF consumer is configured to receive a service request from the terminal device, where the service request is used for indicating the service required by the terminal device;

the NF consumer is further configured to determine that the second data needs to be obtained according to the service request, and send a retrieval request to the UDM; where the retrieval request includes the identifier of the second data, the shared storage identifier associated with the second data, and the location information; and the UDM is further configured to send the second data in the storage path indicated by the location information to the NF consumer.

In one embodiment of the present application provides an apparatus for registering user information, including:

a processing device, configured to obtain registration information of the terminal device; and a communication device, configured to send a registration request to the UDM; where the registration request includes the registration information and location information for identifying the storage path of the registration information in the UDM, and the location information includes the identifier of the NWDAF.

In some embodiments, the location information is a uniform resource identifier (URI).

In some embodiments, the location information further includes an analytics identifier for an event, the analytics identifier for the event is used for indicating the first service performed by the NWDAF for the terminal device, and the registration information is generated when the NWDAF provides the first service for the terminal device.

In some embodiments, the communication device, after sending the registration request to the UDM, is further configured to:

send an update request to the UDM in a case of determining that the registration information is to be updated; where the update request includes updated registration information and the location information, and the update request is used for indicating the UDM to update the registration information in the storage path indicated by the location information to the updated registration information.

In some embodiments, the communication device, after sending the registration request to the UDM, is further configured to:

send a deletion request to the UDM in a case of determining that the registration information needs to be deleted; where the deletion request includes the location information, and the deletion request is used for indicating the UDM to delete the registration information in the storage path indicated by the location information.

In one embodiment of the present application provides another apparatus for registering user information, including:

a communication device, configured to receive a registration request from the NWDAF; where the registration request includes registration information of the terminal device and location information for identifying the storage path of the registration information in the apparatus, and the location information includes the identifier of the NWDAF; and a processing device, configured to store the registration information in a storage path indicated by the location information.

In some embodiments, after the processing device is configured to store the registration information in the storage path indicated by the location information, the communication device is further configured to receive an update request from the NWDAF; where the update request includes updated registration information and the location information; and the processing device is further configured to update the registration information in the storage path indicated by the location information to the updated registration information according to the update request.

In some embodiments, after the processing device is configured to store the registration information in the storage path indicated by the location information, the communication device is further configured to receive a deletion request from the NWDAF; where the deletion request includes the location information; and the processing device is further configured to delete the registration information in the storage path indicated by the location information according to the deletion request.

In some embodiments, after the processing device is configured to store the registration information in the storage path indicated by the location information, the communication device is further configured to receive a retrieval request from a NF consumer; where the retrieval request includes the identifier of the first data and the location information; and the processing device is further configured to send the first data in the storage path indicated by the location information to the NF consumer.

In one embodiment of the present application provides another apparatus for registering user information, including:

a processing device, configured to obtain registration information of the terminal device; and a communication device, configured to send a registration request to the UDM; where the registration request includes the registration information and location information for identifying a storage path of the registration information in the UDM; and the registration information includes second data, the second data is associated with a shared storage identifier, and the shared storage identifier is used for indicating that the second data belongs to the first NWDAF.

In some embodiments, the location information is a uniform resource identifier (URI).

In some embodiments, the registration information further includes third data, and the third data is not associated with the shared storage identifier to indicate that the third data is stored in the storage path indicated by the location information.

In some embodiments, the communication device, after sending the registration request to the UDM, is further configured to:

send an update request to the UDM in a case of determining that the second data is updated, where the update request includes the updated second data, the shared storage identifier associated with the second data, and the location information; and the update request is used for indicating the UDM to update the second data in the storage path indicated by the location information to the updated second data.

In some embodiments, the communication device, after sending the registration request to the UDM, is further configured to:

send a deletion request to the UDM in a case of determining that the second data needs to be deleted; where the deletion request includes the identifier of the second data, the shared storage identifier associated with the second data, and the location information; and the deletion request is used for indicating the UDM to delete the second data in the storage path indicated by the location information.

In one embodiment of the present application provides an apparatus for registering user information, including:

a communication device, configured to receive a registration request from the first NWDAF; where the registration request includes registration information of the terminal device and location information for identifying a storage path of the registration information in the apparatus; the registration information is obtained by the NWDAF during a process of registering the terminal device to a core network; the registration information includes second data, the second data is associated with a shared storage identifier, and the shared storage identifier is used for indicating that the second data belongs to the first NWDAF; and the first NWDAF is any one of at least one of NWDAFs serving for the terminal device; and a processing device, configured to store the second data in the storage path indicated by the location information.

In some embodiments, after the processing device is configured to store the second data in the storage path indicated by the location information, the communication device is further configured to receive an update request from the first NWDAF; where the update request includes the updated second data, the shared storage identifier associated with the second data, and the location information; and the processing device is further configured to update the second data in the storage path indicated by the location information to the updated second data.

In some embodiments, after the processing device is configured to store the second data in the storage path indicated by the location information, the communication device is further configured to receive a deletion request from the first NWDAF; where the deletion request includes the identifier of the second data, the shared storage identifier associated with the second data, and the location information; and the processing device is further configured to delete the second data in the storage path indicated by the location information.

In one embodiment of the present application provides another apparatus for registering user information, including a memory and a processor;

where the memory is configured to store at least one program instruction; and the processor is configured to call the at least one program instruction stored in the memory, and execute the method in any implementation of the embodiments according to the obtained program.

In one embodiment of the present application provides another apparatus for registering user information, including a memory and a processor;

where the memory is configured to store at least one program instruction; and the processor is configured to call the at least one program instruction stored in the memory, and execute the method in any implementation of the embodiments according to the obtained program.

In one embodiment of the present application provides a computer-readable storage medium, storing at least one computer instruction; where the at least one computer instruction, when run on a computer, causes the computer to execute the above method.

In addition, for the effects brought about by any of the implementations of the embodiments, reference may be made to the effects brought about by the different implementations of the other embodiments, and details will not be repeated here.

DETAILED DESCRIPTION

In order to make embodiments of the present application clearer, the present application will be further described in detail below in conjunction with the accompanying drawings. Apparently, the described embodiments are only some of the embodiments of the present application, rather than all embodiments of the present application.

The application scenarios described in the embodiments of the present application are to illustrate the embodiments of the present application more clearly, and do not constitute limitations on the embodiments of the present application. The emergence of new application scenarios, the embodiments of the present application are also applicable to similar problems. In the description of the present application, unless otherwise specified, "plurality" means two or more.

Figure 1:
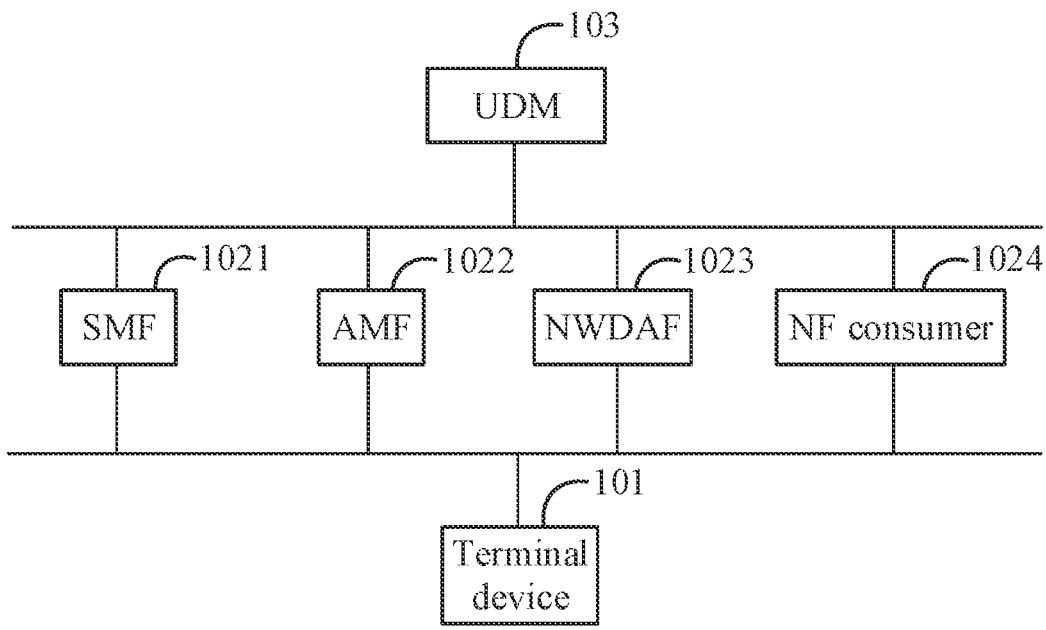
FIG. 1 is a schematic diagram of a communication system architecture provided by an embodiment of the present application.

FIG. 1 illustrates a communication system architecture. It should be understood that the embodiments of the present application are not limited to the system shown in FIG. 1. In addition, the apparatus in FIG. 1 may be hardware, or software divided functionally, or a combined structure of both of the above. As shown in FIG. 1, the system architecture provided by the embodiments of the present application includes a terminal device 101, a session management function (SMF) 1021, an access and mobility management function (AMF) 1022, a NWDAF 1023, a network function consumer (NF consumer) 1024 and a unified data management (UDM) 103. The embodiments of the present application do not limit the numbers of terminal devices, NWDAFs, SMFs and AMFs included in the system. In FIG. 1, only one of each is used as an example for introduction. In one embodiment, it should be noted that the communication system may also include other network elements, for example, the communication system may also include an access network device, which is not shown in FIG. 1.

The terminal device 101, also referred to as a terminal, a mobile station (MS), a mobile terminal (MT), etc., and is a device that provides voice and/or data connectivity to users, for example, a hand-held device with wireless connectivity, a vehicle-mounted device, etc. At present, examples of some terminals are: a mobile phone, a tablet computer, a laptop, a personal digital assistant (PDA), a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, etc.

The SMF 1021 is a functional device based on the service architecture in the 5G communication system. The SMF is mainly responsible for session management, such as session establishment, modification and release; and is also used for implementing functions such as assigning and managing IP addresses of terminal devices.

The AMF 1022 is a functional device in the 5G communication system, which is mainly responsible for the realization of functions such as registration of terminal devices and access to the core network.

The NWDAF 1023, by collecting information such as connection management, mobility management, session management, and access services of a user's terminal device, and by using reliable analytics and prediction models, analyzes different types of users, builds user portraits and determines user mobility trajectories and service usage habits, as well as predicts user behavior; and optimizes user mobility management parameters and radio resource management parameters, etc., based on analytics and prediction data.

The UDM 103 is an intelligent management platform for data service and data service operation, and is characterized by: simple deployment, hierarchical management of users for user and data application security, and implementation of overall security guarantees to ensure the security of data storage.

Since the network element such as the SMF or AMF is unique when providing services for a terminal device, that is, one SMF (or AMF) can only serve one terminal device, so the network element currently serving a certain terminal device will register the registration information in the UDM, and therefore the registration information of the terminal device registered by the SMF and stored in the UDM is unique. However, since NWDAFs can serve the same UE, when different NWDAFs register the registration information of the same terminal device in the UDM, the information registered by the previous NWDAF may be overwritten by the information registered by the latter NWDAF.

The embodiments of the present application provide a method and apparatus for registering user information. When the NWDAF registers user information, the identifier of the NWDAF is added to the location information used for indicating the storage path and included in the registration request sent. Therefore, when different NWDAFs register the registration information of the same terminal device, the storage paths in the UDM are different, to solve the situation that the registration information is overwritten.

Figure 2:
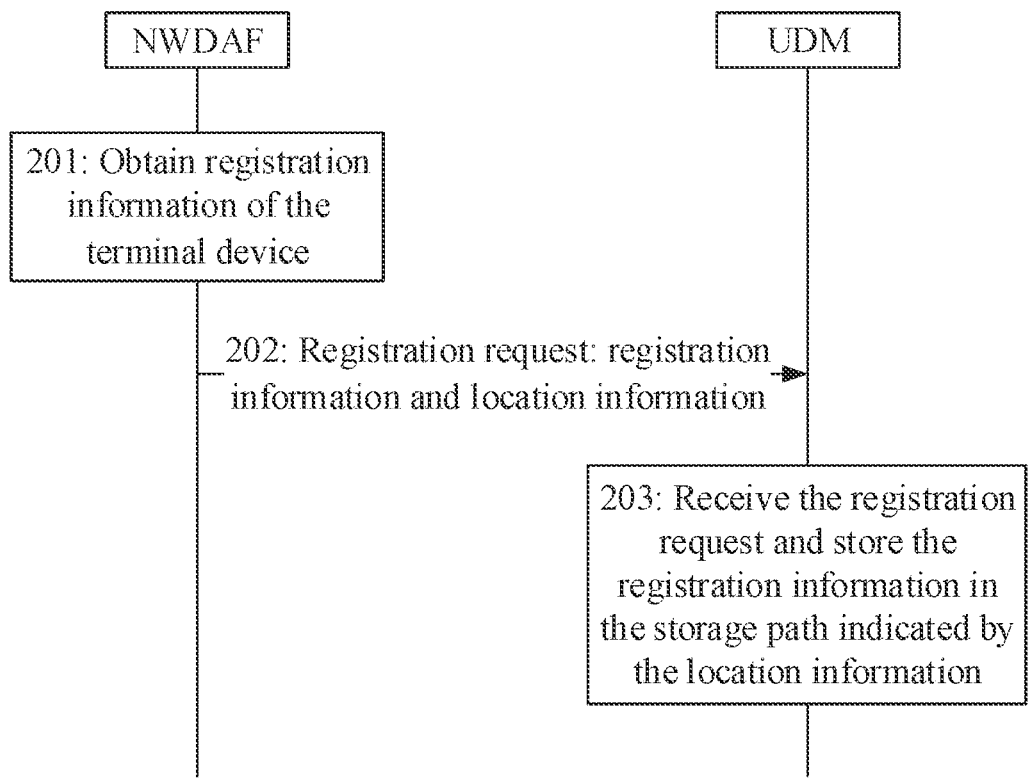
FIG. 2 is a flow chart of a method for registering user information provided by an embodiment of the present application.

Next, a method for registering the user information provided by the embodiments of the present application is introduced. Referring to FIG. 2, which is a flow chart of a method for registering user information provided by the embodiment of the present application. The method is performed by the NWDAF, and the NWDAF may be performing the process may be a first NWDAF shown in FIG. 1 or the second NWDAF, which is not specifically limited in the present application. The method flow includes the following.

201. The NWDAF obtains the registration information of the terminal device.

In one embodiment, the registration information may include one or more of the following: the serial number or identifier of the terminal device, the identifier of the NWDAF, the analytics identifier for the event, the registration time, the context information of the terminal device (UE Context Information) or the services that NWDAF can provide for the terminal device, etc. The identifier of the NWDAF may include the NWDAF's instance number (NWDAF Instance Id) or the NWDAF's set number (NWDAF Set Id). It should be noted that both the instance number of the NWDAF and the set number of the NWDAF can uniquely identify the NWDAF in the communication system. The set number of the NWDAF is the serial number of the NWDAF in one NWDAF set. For example, the set number of the NWDAF is composed of the serial number of the NWDAF set including the NWDAF and the serial number of the NWDAF in the NWDAF set. The analytics identifier for the event may use an analytics identifier (analytics Id) for an event, which is used for indicating the first service performed by the NWDAF for the terminal device. It should be noted that the registration information is generated when the NWDAF provides the first service for the terminal device, and the first service is any one of the services that the NWDAF can provide for the terminal device.

In one embodiment, the NWDAF obtaining the registration information of the terminal device may include: the NWDAF receiving the context information of the terminal device from a NWDAF service consumer or other network elements (for example, AMF or SMF, etc.) Further, the NWDAF can generate the registration information of the terminal device according to the received context information of the terminal device. For example, after receiving the context information of the terminal device, the NWDAF can generate information such as the instance number of the NWDAF, the analytics identifier for the event, or the registration time, and use the above generated information together with the received context information of the user as the registration information of the terminal device. Of course, the above manner is only an example, and the NWDAF can also obtain the registration information of the terminal device by other manners, which is not specifically limited in the present application.

202. The NWDAF sends a registration request to the UDM, where the registration request includes registration information and location information.

In one embodiment, the location information is used for identifying the storage path of the registration information in the UDM; and the location information includes the identifier of the NWDAF, for example, may include the instance number of the NWDAF or the set number of the NWDAF.

In one embodiment, the location information may be a uniform resource identifier (URI). As an example, the instance number of the NWDAF is adopted as the identifier of the NWDAF. For example, the location information can be: /{ueId}/registrations/nwdaf-registration/nwdafInstanceId, where "ueId" is used for identifying that it is which terminal device's registration information, "registrations" is used for indicating that the registration request is one registration request, "nwdaf-registration" is used for indicating that the registration request is a registration request from the NWDAF, and "nwdafInstanceId" is the instance number of the NWDAF.

203. The UDM receives the registration request, and stores the registration information in the storage path indicated by the location information.

In one embodiment, after receiving the registration request, the UDM may determine a storage path according to the location information in the registration request, and store the registration information included in the registration request in the storage path.

In a possible embodiment, after the UDM stores the registration information in the storage path indicated by the location information, the UDM may also return indication information for indicating successful registration to the NWDAF. For example, the indication information may be: "200 OK", "201 Created" or "204 Content". As an example, while the UDM sends the indication information for indicating successful registration to the NWDAF, the indication information may also carry an identifier of successful registration or registration information. Therefore, the NWDAF can know which registration information is successfully registered.

In another possible embodiment, if the UDM cannot store the above registration information due to some reasons, for example, the UDM determines that the NWDAF sending the registration request cannot provide services for the terminal device according to the authorization information provided in advance by the terminal device. In this case, the UDM may return indication information for indicating registration failure. For example, the indication information may include a status code of the hyper text transfer protocol (HTTP) for indicating the current transmission status, such as "403 Forbidden" or "404 Not Found", for indicating that the registration information is not received or processed by the UDM. In one embodiment, while the UDM sends the indication information for indicating registration failure, the indication information may also carry error information (problem details).

In some embodiments, the location information sent by the NWDAF to the UDM may also include an analytics identifier for an event, which is used for indicating the first service performed by the NWDAF for the terminal device. The first service is one of the services that NWDAF can provide for the terminal device. As an example, the analytics identifier for the event may be represented by an analytics identifier (analytics Id) for an event, and the location information may be represented as: /{ueId}/registrations/nwdaf-registration/nwdafInstanceId/{analyticsId}, where the contents represented by "ueId", "registrations", "nwdaf-registration" and "nwdafInstanceId" can refer to the relevant introduction in the above step 202 of FIG. 2, and will not be repeated here. The "analytics Id" is used for indicating the analytics identifier for the event of the service performed by the NWDAF for the terminal device.

In the following, the first method for registering user information provided in the embodiments of the present application will be introduced in combination with specific scenarios.

Scenario 1: An Update Scenario.

The NWDAF determines that the registration information of the terminal device is to be updated. For example, when the service capability of the NWDAF changes, such as a certain service is added, or when the terminal device no longer needs the NWDAF to provide a certain service, the registration information of the terminal device will be updated.

In some embodiments, after determining that the registration information is to be updated, the NWDAF may send an update request to the UDM, where the update request includes the updated registration information and the location information. In one embodiment, the location information can be found in the above example and will not be repeated here. After receiving the update request, the UDM can delete the registration information in the storage path indicated by the location information included in the update request, and store the updated registration information included in the update request in the storage path indicated by the location information.

In some other embodiments, the NWDAF may also update only one or several pieces of data in the registration information. The following takes a change of data A in the registration information as an example for introduction. In one embodiment, after determining that data A is to be updated, the NWDAF may also send an update request to the UDM, where the update request may include the updated data A, the identifier of the data A, and the location information. After receiving the update request, the UDM may determine, according to the identifier of the data A, that the data A stored in the storage path indicated by the location information needs to be updated. Further, the UDM may delete the data A in the storage path indicated by the location information, and store the updated data A in the storage path indicated by the location information.

In one possible case, if the update is successful, that is, the UDM successfully updates the data included in the update request (it can be the registration information or the data included in the registration information) to the storage path indicated by the location information, then the UDM may return indication information for indicating the successful update to the NWDAF, for example, the indication information may be "204 No Content", etc. In one embodiment, the UDM may also return the successfully updated data, or the successfully updated identifier, or the successfully updated data and the successfully updated identifier to the NWDAF along with the indication information.

In another possible case, if the update is not successful, for example, when the storage path indicated by the location information received by the UDM does not exist, or the data that needs to be updated does not exist, the UDM cannot update the data, and the UDM can return indication information indicating the update failure to the NWDAF, such as "404 Not Found". In one embodiment, the UDM can also return the error information together with the indication information to the NWDAF. Where, the error information is used for indicating the reason for the update failure.

Figure 3A:
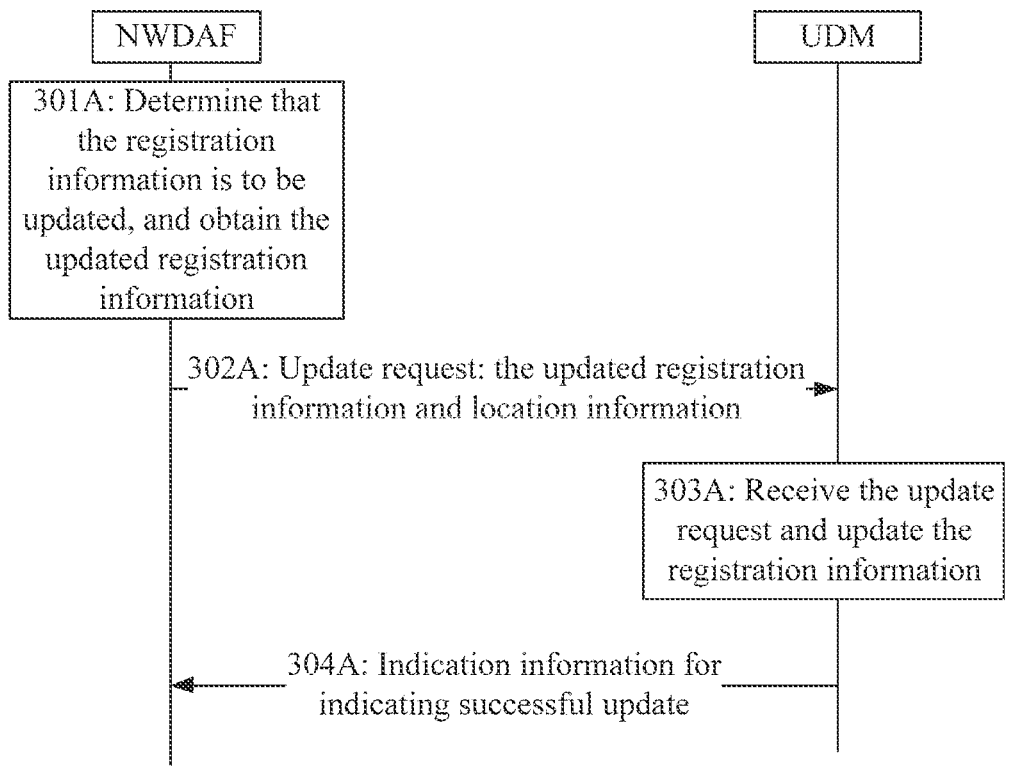
FIG. 3A is a schematic diagram of a flow for updating user information provided by an embodiment of the present application.

In one embodiment, a specific update process may refer to the process shown in FIG. 3A. It should be noted that, the process shown in FIG. 3A is described by an example that the entire registration information is updated and the update is successful, and includes the following.

301A. The NWDAF determines that the registration information is to be updated, and obtains the updated registration information.

302A. The NWDAF sends an update request to the UDM, where the update request includes the updated registration information and the location information.

In one embodiment, the location information may refer to the introduction in the above embodiments, which will not be repeated here.

303A. The UDM receives the update request and updates the registration information.

In one embodiment, the UDM may replace the registration information in the storage path indicated with the location information with the updated registration information.

304A. The UDM returns indication information for indicating the successful update to the NWDAF.

Scenario 2: A Deletion Scenario.

The NWDAF determines that the registration information of the terminal device needs to be deleted. For example, when the service provided by the NWDAF for the terminal device has been completed, or the terminal device has left the service scope of the NWDAF, the NWDAF determines that the registration information of the terminal device needs to be deleted. In one embodiment, after the NWDAF determines that the registration information needs to be deleted, the NWDAF may send a deletion request to the UDM, where the deletion request includes the location information. In one embodiment, the location information may refer to the introduction in the foregoing embodiments, which will not be repeated here. In a possible case, after receiving the deletion request, the UDM may delete the registration information in the storage path indicated by the location information included in the deletion request, and may return indication information for indicating successful deletion to the NWDAF. In one embodiment, when the UDM sends the indication information for indicating successful deletion, the indication information may also carry an identifier of successful deletion. In another possible case, if the UDM fails to delete the registration information in the storage path indicated by the location information, the UDM may return indication information for indicating the deletion failure to the NWDAF, and the indication information may also carry error information at the same time to indicate the reason for the deletion failure.

Figure 3B:
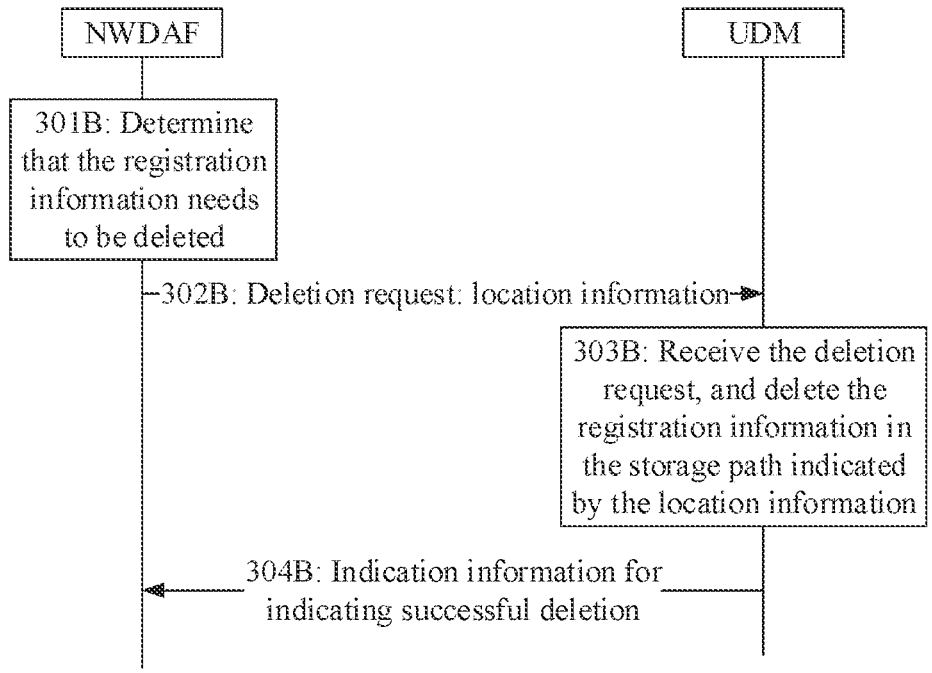
FIG. 3B is a schematic diagram of a flow for deleting user information provided by an embodiment of the present application.

As an example, the specific deletion process may also refer to the flow chart shown in FIG. 3B. It should be noted that the flow chart shown in FIG. 3B is introduced by an example of the successful deletion, and includes the following.

301B. The NWDAF determines that the registration information needs to be deleted.

302B. The NWDAF sends a deletion request to the UDM, where the deletion request includes the location information.

303B. The UDM receives the deletion request, and deletes the registration information in the storage path indicated by the location information.

304B. The UDM returns indication information for indicating the successful deletion to the NWDAF.

Scenario 3: A Retrieval Scenario.

A network function consumer (NF consumer) can first determine that the registration information or one or several pieces of data included in the registration information needs to be obtained. For example, when the terminal device sends a service request to the NF consumer (for example, it can be the AMF, and of course, it can also be other network elements in the communication system), the NF consumer can send a retrieval request to the UDM according to the service request from the terminal device. The retrieval request is used for requesting the NWDAF that provides services for the terminal device and the registration information that the NWDAF registers in the UDM or the data included in the registration information. As an example, the following is described as an example in which the NF consumer needs to obtain the first data included in the registration information, where the first data is any one piece of the data included in the registration information. After determining that the first data needs to be obtained, the NF consumer may send a retrieval request to the UDM, where the retrieval request includes the identifier of the first data and the location information. In one case, the UDM may obtain the first data from the storage path indicated by the location information according to the retrieval request. Further, the UDM may return indication information for indicating that the successful retrieval to the NF consumer, such as "200 OK", and the indication information carries the obtained first data. In another case, if the UDM retrieves no first data in the storage path indicated by the location information, the UDM may return indication information for indicating the retrieval failure to the NF consumer, such as "404 Not Found", and the indication information carries error information.

Figure 3C:
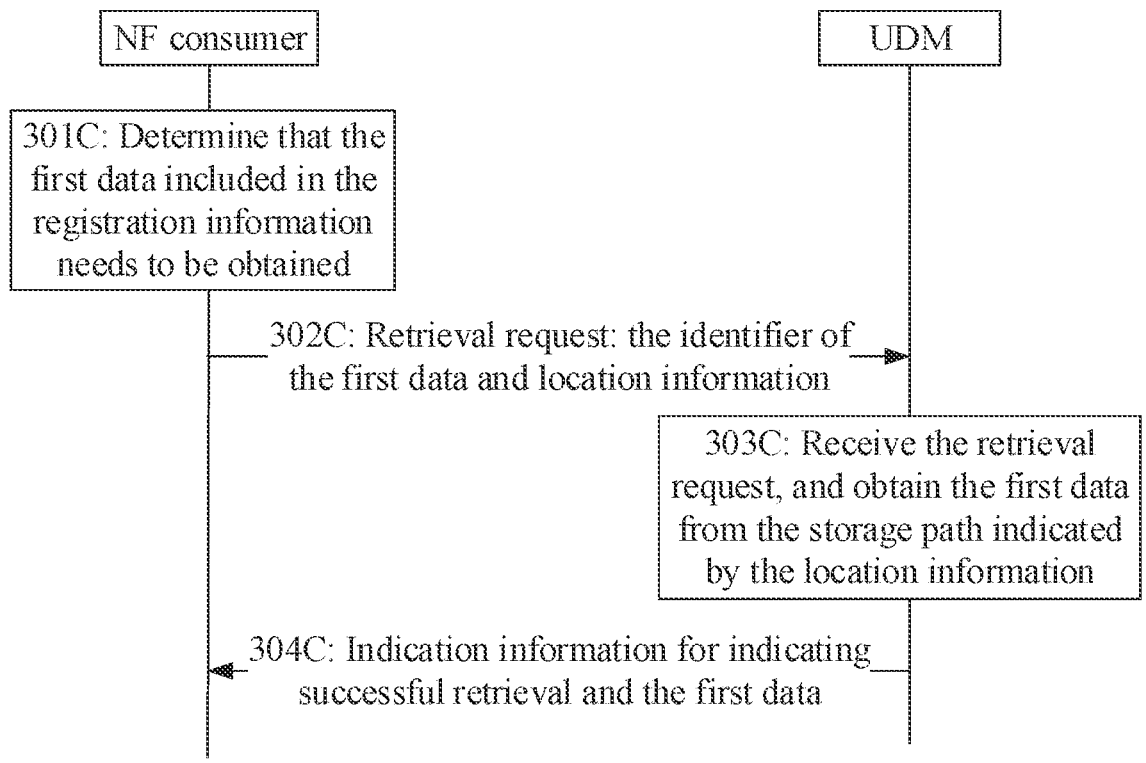
FIG. 3C is a schematic diagram of a flow for retrieve user information provided by the embodiment of the present application.

As an example, the specific retrieval process may refer to the flow chart shown in FIG. 3C. It should be noted that the flow chart shown in FIG. 3C is introduced by an example of the successful retrieval, and includes the following.

301C. The NF consumer determines that the first data included in the registration information needs to be obtained.

302C. The NF consumer sends a retrieval request to the UDM, where the retrieval request includes the identifier of the first data and the location information.

303C. The UDM receives the retrieval request, and obtains the first data from the storage path indicated by the location information.

304C. The UDM returns the indication information for indicating the successful retrieval and the first data to the NF consumer.

Since NWDAFs can serve the same terminal device at the same time, and the NWDAFs need to register the registration information of the terminal device in the UDM, thus the registration information may overwrite each other.

Figure 4:
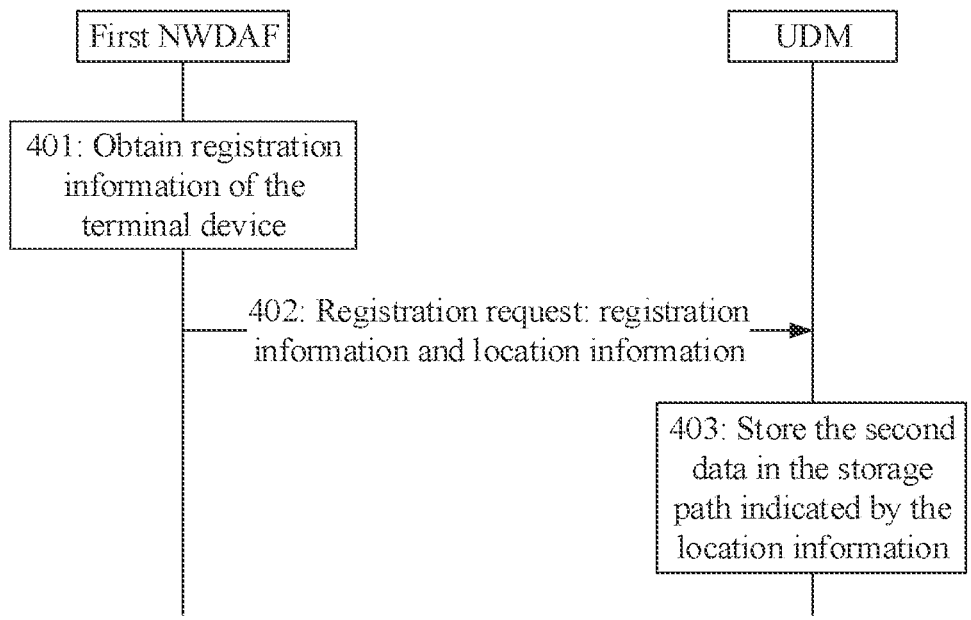
FIG. 4 is a flow chart of another method for registering user information provided by the embodiment of the present application.

Referring to FIG. 4, which is a flow chart of another method for registering user information provided by the embodiment of the present application. The method is performed by the first NWDAF, and the first NWDAF is any one of the NWDAFs serving for the terminal device. The method flow includes the following.

401. The first NWDAF obtains the registration information of the terminal device.

In one embodiment, the registration information of the terminal device may refer to the relevant introduction in step 201 in FIG. 2, which will not be repeated here.

402. The first NWDAF sends a registration request to the UDM, where the registration request includes the registration information and location information.

Where, the registration information includes the second data, the second data is associated with a shared storage identifier, and the shared storage identifier indicates that the second data belongs to the first NWDAF.

In some embodiments, the location information is a uniform resource identifier (URI). In one embodiment, the location information can be expressed as: /{ueId}/registrations/nwdaf-registration, where the content represented by each item can refer to the introduction in step 202 in FIG. 2, and will not be repeated here.

In one embodiment, the location information may also include an analytics identifier for an event, which is used for indicating the first service performed by the first NWDAF for the terminal device. As an example, the analytics identifier for the event adopts the "analyticsId", and the location information may be expressed as: /{ueId}/registrations/nwdaf-registration/{analyticsId}, where the content represented by each item can refer to the above-mentioned embodiments, and will not be repeated here.

403. The UDM stores the second data in the storage path indicated by the location information.

In a possible case, the UDM may store all the received registration information in the storage path indicated by the location information, where the second data included in the registration information is associated with the shared data identifier. In some embodiments, the registration information may also include other data not associated with the shared data identifier. In another possible case, the UDM may also establish a sub-path under the storage path indicated by the location information, and the sub-path may be used as a path shared by at least one NWDAF serving for the terminal device. For the convenience of description, the sub-path is called the shared path in the following. When the UDM receives the second data carrying the shared data identifier, the UDM may store the second data in the shared path. In the subsequent description, an example of the UDM storing the second data in the shared path will be introduced.

In one embodiment, the UDM may also store other data not associated with the shared storage identifier except for the second data in the registration information in the storage path indicated by the location information. Taking the third data as an example, if the third data included in the registration information is not associated with the shared storage identifier, the UDM will store the third data in the storage path indicated by the location information.

In a possible case, if the UDM successfully stores the data, the UDM may return indication information for indicating successful registration to the first NWDAF. The indication information may refer to the descriptions in the foregoing embodiments, and will not be repeated here. In another possible case, if the UDM fails to store data successfully, the UDM may return indication information for indicating registration failure to the first NWDAF, and the indication information carries error information at the same time to indicate the reason for registration failure.

Based on the above solutions, it can be seen that the shared storage identifiers used by different NWDAFs in the present application are different, and even if different NWDAFs store the same data in the shared path, data will not overwrite each other since the shared storage identifiers associated with the data stored by different NWDAFs are different.

In the following, the second method for registering user information provided by the present application will be introduced in combination with specific scenarios.

Scenario 4: An Update Scenario.

In some embodiments, after the first NWDAF determines that the second data included in the registration information of the terminal device has been updated, the first NWDAF sends an update request to the UDM. The update request includes the updated second data, the shared storage identifier associated with the second data and the location information. In one embodiment, the location information may refer to the example in step 402 in FIG. 4, and will not be repeated here. After receiving the update request, the UDM may determine that the updated second data included in the update request needs to be stored in the shared path included in the storage path indicated by the location information according to the shared storage identifier associated with the second data included in the update request. The UDM may delete the second data in the shared path, and store the updated second data in the shared path, to complete the update of the second data. In a possible case, if the update is successful, that is, the UDM successfully replaces the original second data in the shared path with the updated second data, the UDM may return indication information for indicating the successful update to the first NWDAF. In another possible case, if the update fails, the UDM may return indication information for indicating the update failure to the first NWDAF. The specific indication information and the reason for update failure may refer to the description in scenario 1, and will not be repeated here.

Figure 5A:
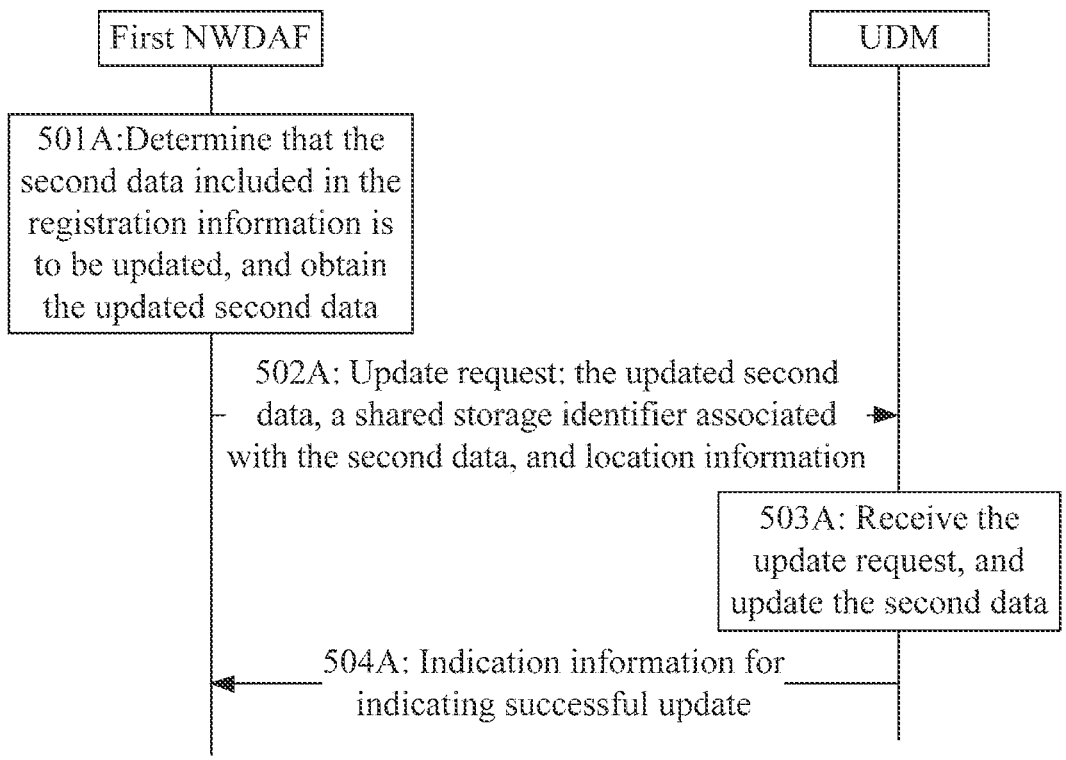
FIG. 5A is a schematic diagram of another flow for updating user information provided by the embodiment of the present application.

As an example, a specific update process may refer to the process shown in FIG. 5A. It should be noted that, the process shown in FIG. 5A is introduced by taking the successful update of the second data as an example, and includes the following.

501A. The first NWDAF determines that the second data included in the registration information is to be updated, and obtains the updated second data.

502A. The first NWDAF sends an update request to the UDM, where the update request includes the updated second data, a shared storage identifier associated with the second data, and location information.

503A. The UDM receives the update request, and updates the second data.

In one embodiment, the UDM determines, according to the location information and the shared storage identifier associated with the second data, that the second data in the shared path in the storage path indicated by the location information needs to be updated. Further, the UDM may delete the second data stored in the shared path, and store the updated second data included in the update request in the shared path.

504A. The UDM returns indication information for indicating the successful update to the first NWDAF.

Scenario 5: A Deletion Scenario.

When the first NWDAF determines that the second data in the registration information needs to be deleted, the first NWDAF may send a deletion request to the UDM, where the deletion request includes the identifier of the second data, the shared storage identifier associated with the second data, and location information. For an introduction on how to determine that the second data and location information need to be deleted, reference may be made to the description in the above scenario 2, and details will not be repeated here. In a possible case, after receiving the deletion request, the UDM may delete the second data under the shared path in the storage path indicated by the location information according to the deletion request, and may return indication information for indicating the successful deletion to the first NWDAF, where the indication information may also carry an identifier of successful deletion. In another possible case, if the UDM fails to delete the second data in the shared path successfully, the UDM may return indication information for indicating deletion failure to the first NWDAF, and the indication information may also carry error information at the same time.

Figure 5B:
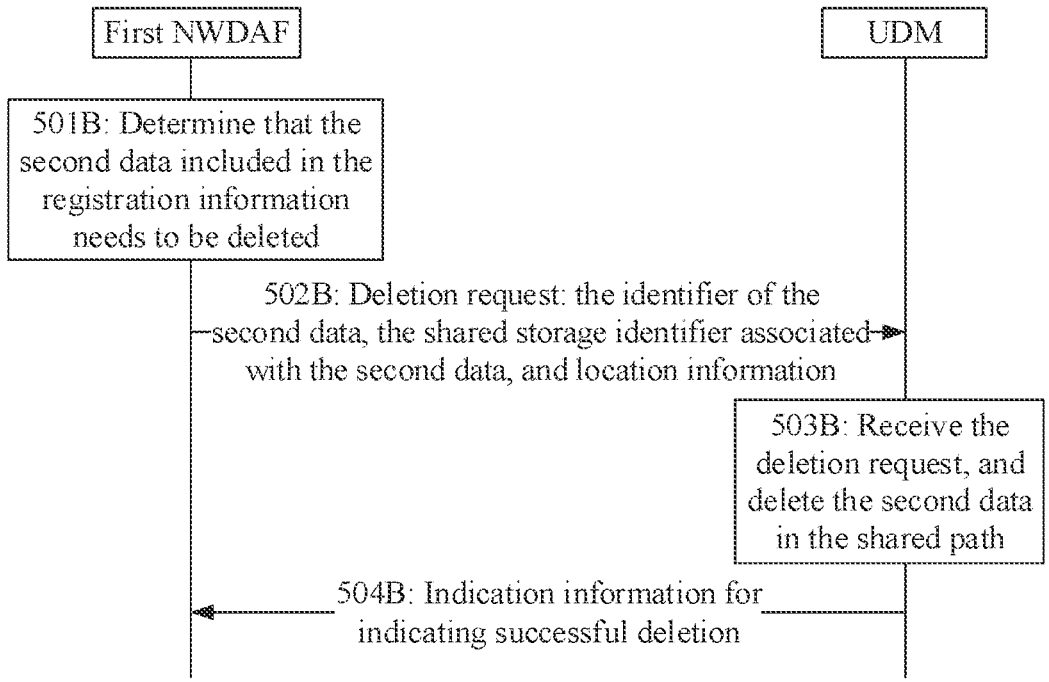
FIG. 5B is a schematic diagram of another flow for deleting user information provided by the embodiment of the present application.

As an example, the specific deletion process may also refer to the flowchart shown in FIG. 5B. It should be noted that the flowchart shown in FIG. 5B is introduced by taking the successful deletion as an example, and includes the following.

501B. The first NWDAF determines that the second data included in the registration information needs to be deleted.

502B. The first NWDAF sends a deletion request to the UDM, where the deletion request includes the identifier of the second data, the shared storage identifier associated with the second data, and location information.

503B. The UDM receives the deletion request, and deletes the second data in the shared path.

In one embodiment, the UDM determines, according to the deletion request, that the second data in the shared path under the storage path indicated by the location information needs to be deleted, and performs the deletion operation.

504B. The UDM returns indication information for indicating successful deletion to the first NWDAF.

Scenario 6: A Retrieval Scenario.

The NF consumer first determines that the registration information or the data included in the registration information needs to be obtained, and details refer to the description in scenario 3, which will not be repeated here. After the determination, the NF consumer can send a retrieval request to the UDM, where the retrieval request includes the identifier of the data to be obtained, the shared storage identifier associated with the data, and location information. As an example, the following is described as an example in which the NF consumer needs to obtain the second data included in the registration information. When the NF consumer determines that the second data included in the registration information needs to be obtained, the NF consumer may send the retrieval request to the UDM, where the retrieval request includes the identifier of the second data, the shared storage identifier associated with the second data, and location information. In a case, the UDM may obtain the second data from the storage path indicated by the location information according to the retrieval request. Then the UDM may return the obtained second data to the NF consumer, where the obtained second data may carry indication information for indicating successful retrieval. In another case, if the UDM retrieves no second data from the shared data, the UDM may return indication information indicating the retrieval failure to the NF consumer, where the indication information may also carry error information.

Based on the above solutions, when the NF consumer needs to retrieve the second data stored by the first NWDAF, the retrieval request sent to the UDM may carry the shared storage identifier used by the first NWDAF and associated with the second data, and the NF consumer can accurately obtain the second data stored by the first NWDAF, to improve the retrieval efficiency.

Figure 5C:
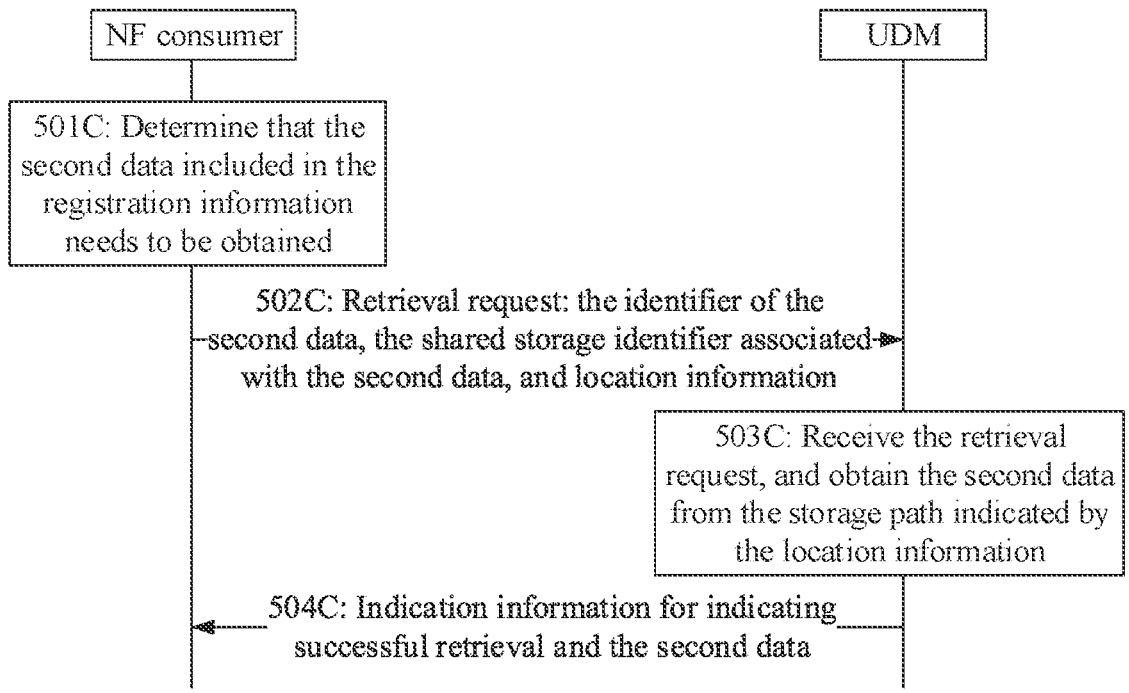
FIG. 5C is a schematic diagram of another flow for retrieve user information provided by the embodiment of the present application.

As an example, the specific retrieval process may refer to the flowchart shown in FIG. 5C. It should be noted that the flowchart shown in FIG. 5C is introduced by taking the successful retrieval as an example, and includes the following.

501C. The NF consumer determines that the second data included in the registration information needs to be obtained.

502C. The NF consumer sends a retrieval request to the UDM, where the retrieval request includes the identifier of the second data, the shared storage identifier associated with the second data, and location information.

Where, the shared storage identifier associated with the second data is used for indicating that the second data is stored in the storage path indicated by the location information.

503C. The UDM receives the retrieval request, and obtains the second data from the storage path indicated by the location information.

504C. The UDM returns indication information for indicating the successful retrieval and the second data to the NF consumer.

Figure 6:
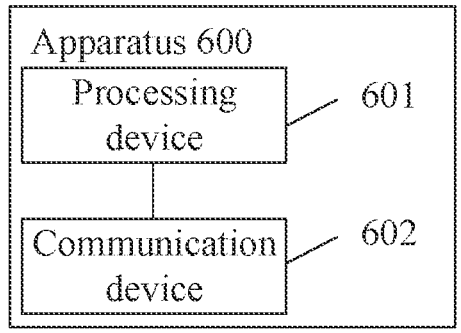
FIG. 6 is a schematic structural diagram of an apparatus 600 for registering user information provided by an embodiment of the present application.

Based on the same idea as the above method, referring to FIG. 6, an embodiment of the present application provides an apparatus 600 for registering user information. The apparatus 600 can perform each step in the above method, and details are not described here again to avoid repetition. The apparatus 600 includes: a processing unit 601 and a communication device 602.

In a possible scenario: the processing device 601 is configured to obtain registration information of the terminal device; and the communication device 602 is configured to send a registration request to the UDM; where the registration request includes the registration information and location information for identifying the storage path of the registration information in the UDM, and the location information includes an identifier of the NWDAF.

In some embodiments, the location information is a uniform resource identifier (URI).

In some embodiments, the location information further includes an analytics identifier for an event, the analytics identifier for the event is used for indicating the first service performed by the NWDAF for the terminal device, and the registration information is generated when the NWDAF provides the first service for the terminal device.

In some embodiments, after sending the registration request to the UDM, the communication device 602 is further configured to:

send an update request to the UDM in a case of determining that the registration information is to be updated; where the update request includes updated registration information and the location information, and the update request is used for indicating the UDM to update the registration information in the storage path indicated by the location information to the updated registration information.

In some embodiments, after sending the registration request to the UDM, the communication device 602 is further configured to:

send a deletion request to the UDM in a case of determining that the registration information needs to be deleted; where the deletion request includes the location information, and the deletion request is used for indicating the UDM to delete the registration information in the storage path indicated by the location information.

In another possible scenario: the processing device 601 is configured to obtain registration information of the terminal device; and the communication device 602 is configured to send a registration request to the UDM; where the registration request includes the registration information and location information for identifying a storage path of the registration information in the UDM; and the registration information includes second data, the second data is associated with a shared storage identifier, and the shared storage identifier is used for indicating that the second data belongs to the first NWDAF.

In some embodiments, the location information is a uniform resource identifier (URI).

In some embodiments, the registration information further includes third data, and the third data is not associated with the shared storage identifier to indicate that the third data is stored in the storage path indicated by the location information.

In some embodiments, after sending the registration request to the UDM, the communication device 602 is further configured to:

send an update request to the UDM in a case of determining that the second data is to be updated; where the update request includes the updated second data, the shared storage identifier associated with the second data, and the location information; and the update request is used for indicating the UDM to update the second data in the storage path indicated by the location information to the updated second data.

In some embodiments, after sending the registration request to the UDM, the communication device 602 is further configured to:

send a deletion request to the UDM in a case of determining that the second data needs to be deleted; where the deletion request includes the identifier of the second data, the shared storage identifier associated with the second data, and the location information; and the deletion request is used for indicating the UDM to delete the second data in the storage path indicated by the location information.

In another possible scenario: the communication device 602 is configured to receive a registration request from the NWDAF; where the registration request includes registration information of the terminal device and location information for identifying the storage path of the registration information in the apparatus, and the location information includes an identifier of the NWDAF; and the processing device 601 is configured to store the registration information in the storage path indicated by the location information.

In some embodiments, the location information is a uniform resource identifier (URI).

In some embodiments, the location information further includes an analytics identifier for an event, the analytics identifier for the event is used for indicating a first service performed by the NWDAF for the terminal device, and the registration information is generated when the NWDAF provides the first service for the terminal device.

In some embodiments, after the processing device 601 is configured to store the registration information in the storage path indicated by the location information, the communication device 602 is further configured to receive an update request from the NWDAF; where the update request includes updated registration information and the location information; and the processing device 601 is further configured to update the registration information in the storage path indicated by the location information to the updated registration information according to the update request.

In some embodiments, after the processing device 601 is configured to store the registration information in the storage path indicated by the location information, the communication device 602 is further configured to receive a deletion request from the NWDAF; where the deletion request includes the location information; and the processing device 601 is further configured to delete the registration information in the storage path indicated by the location information according to the deletion request.

In some embodiments, after the processing device 601 is configured to store the registration information in the storage path indicated by the location information, the communication device 602 is further configured to receive a retrieval request from a NF consumer; where the retrieval request includes the identifier of the first data and the location information; and the processing device 601 is further configured to send the first data in the storage path indicated by the location information to the NF consumer.

In another possible scenario: the communication device 602 is configured to receive a registration request from the first NWDAF; where the registration request includes registration information of the terminal device and location information for identifying the storage path of the registration information in the apparatus; the registration information is obtained by the NWDAF during a process of registering the terminal device to a core network; the registration information includes second data, the second data is associated with a shared storage identifier, and the shared storage identifier is used for indicating that the second data belongs to the first NWDAF; and the first NWDAF is any one of at least one of NWDAFs serving for the terminal device; and the processing device 601 is configured to store the second data in the storage path indicated by the location information.

In some embodiments, the location information is a uniform resource identifier (URI).

In some embodiments, the registration information further includes third data, and the third data is not associated with the shared storage identifier to indicate that the third data is stored in the storage path indicated by the location information.

In some embodiments, after the processing device 601 is configured to store the second data in the storage path indicated by the location information, the communication device 602 is further configured to receive an update request from the first NWDAF; where the update request includes the updated second data, the shared storage identifier associated with the second data, and the location information; and the processing device 601 is further configured to update the second data in the storage path indicated by the location information to the updated second data.

In some embodiments, after the processing device 601 is configured to store the second data in the storage path indicated by the location information, the communication device 602 is further configured to receive a deletion request from the first NWDAF; where the deletion request includes the identifier of the second data, the shared storage identifier associated with the second data, and the location information; and the processing device 601 is further configured to delete the second data in the storage path indicated by the location information.

In some embodiments, after the processing device 601 is configured to store the second data in the storage path indicated by the location information, the communication device 602 is further configured to receive a retrieval request from a NF consumer; where the retrieval request includes an identifier of the second data, a shared storage identifier associated with the second data, and the location information; and the processing device 601 is further configured to send the second data in the storage path indicated by the location information to the NF consumer.

Figure 7:
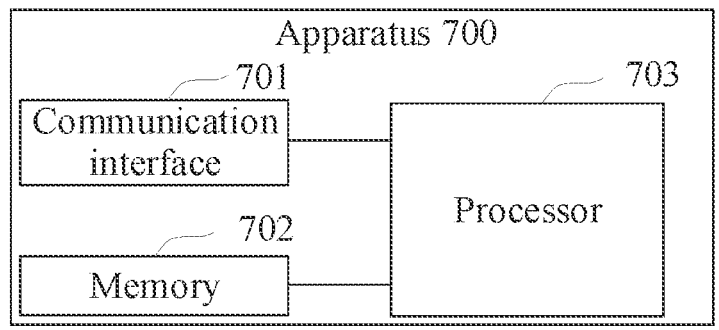
FIG. 7 is a schematic structural diagram of an apparatus 700 for registering user information provided by an embodiment of the present application.

The embodiment of the present application also provides another apparatus 700 for registering user information, as shown in FIG. 7, and including: a communication interface 701, a memory 702 and a processor 703; where, the registration apparatus 700 communicates with other devices through the communication interface 701, such as sending and receiving messages; the memory 702 is configured to store at least one program instruction; and the processor 703 is configured to call the at least one program instruction stored in the memory 702, execute any method provided in the above embodiments according to an obtained program.

The embodiments of the present application do not limit the specific connection medium among the communication interface 701, the memory 702, and the processor 703, such as a bus, which can be divided into an address bus, a data bus, and a control bus.

In the embodiments of the present application, the processor may be a general-purpose processor, a digital signal processor, an application specific integrated circuit, a field programmable gate array or other programmable logic devices, a discrete gate or transistor logic device, or discrete hardware component, and can implement or execute the methods, steps, and logical block diagrams disclosed in the embodiments of the present application. The general-purpose processor may be a microprocessor or any conventional processor or the like. The steps of the method disclosed in combination with the embodiments of the present application may be directly embodied as being executed and completed by a hardware processor, or executed and completed by a combination of hardware and software modules in the processor.

In the embodiments of the present application, the memory may be a non-volatile memory, such as a hard disk drive (HDD) or a solid-state disk (solid-state drive, SSD), etc., may also be a volatile memory, such as random-access memory (RAM). The memory may also be any other medium that can be configured to carry or store desired program codes in the form of instructions or data structures and that can be accessed by a computer, but is not limited thereto. The memory in the embodiments of the present application may also be a circuit or any other apparatus capable of realizing a storage function for storing program instructions and/or data.

The embodiments of the present application also provide a computer-readable storage medium, including program codes. The program codes, when run on the computer, cause the computer to execute the steps of the method provided in the above embodiments of the present application.

The embodiments of the present application may be provided as a method, a system or a computer program product. Therefore, the present application can adopt forms of full hardware embodiments, full software embodiments, or embodiments combining software and hardware aspects. In one embodiment, the present application can adopt a form of the computer program products implemented on one or more computer available storage mediums (including but not limited to a disk memory, compact disc read only memory (CD-ROM), an optical memory and the like) containing computer available program codes.

These computer program instructions may also be loaded to the computer or other programmable data processing devices, and a series of operating steps are executed on the computer or other programmable devices to generate computer-implemented processing, and the instructions executed on the computer or other programmable devices provide steps for implementing the functions specified in one or more flows in the flow diagrams and/or one or more blocks in the block diagrams.

Although only some the embodiments of the present application have been described, additional modifications and variations on these embodiments can be made. Therefore, the appended claims intend to be explained as including the embodiments and all modifications and variations falling within the scope of the present application.

Various modifications and variations to the present application without departing from the scope of the present application. In this way, if these modifications and variations of the present application fall within the scope of the claims of the present application and their equivalent art, the present application also intends to include these modifications and variations.

What is claimed is:

1. A method for registering user information, comprising:
   obtaining, by a network data analytic function (NWDAF), registration information of a terminal device; and
   sending, by the NWDAF, a registration request to a unified data management (UDM); wherein the registration request comprises the registration information and location information for identifying a storage path of the registration information in the UDM, and the location information comprises an identifier of the NWDAF;
   wherein after the NWDAF sends the registration request to the UDM, the method further comprises:
   sending, by the NWDAF, an update request to the UDM in a case that the NWDAF determines that the registration information is to be updated, wherein the update request comprises updated registration information and the location information, and the update request is configured for indicating the UDM to update the registration information in the storage path indicated by the location information to the updated registration information; or
   sending, by the NWDAF, a deletion request to the UDM in a case that the NWDAF determines that the registration information needs to be deleted, wherein the deletion request comprises the location information, and the deletion request is configured for indicating the UDM to delete the registration information in the storage path indicated by the location information.

2. The method according to claim 1, wherein the location information is a uniform resource identifier (URI).

3. The method according to claim 1, wherein the location information further comprises an analytics identifier for an event;
   wherein the analytics identifier for the event is used for indicating a first service performed by the NWDAF for the terminal device, and the registration information is generated when the NWDAF provides the first service for the terminal device.

4. An apparatus for registering user information, comprising:
   a memory and a processor;
   wherein the memory is configured to store at least one program instruction; and
   the processor is configured to call the at least one program instruction stored in the memory, and execute the method of claim 1 according to an obtained program, wherein the method comprises:
   obtaining, by a network data analytic function (NWDAF), registration information of a terminal device; and
   sending, by the NWDAF, a registration request to a unified data management (UDM); wherein the registration request comprises the registration information and location information for identifying a storage path of the registration information in the UDM, and the location information comprises an identifier of the NWDAF;
   wherein after the NWDAF sends the registration request to the UDM, the method further comprises:
   sending, by the NWDAF, an update request to the UDM in a case that the NWDAF determines that the registration information is to be updated, wherein the update request comprises updated registration information and the location information, and the update request is used for indicating the UDM to update the registration information in the storage path indicated by the location information to the updated registration information; or
   sending, by the NWDAF, a deletion request to the UDM in a case that the NWDAF determines that the registration information needs to be deleted, wherein the deletion request comprises the location information, and the deletion request is configured for indicating the UDM to delete the registration information in the storage path indicated by the location information.

5. The apparatus according to claim 4, wherein the location information is a uniform resource identifier (URI).

6. The apparatus according to claim 4, wherein the location information further comprises an analytics identifier for an event;
   wherein the analytics identifier for the event is used for indicating a first service performed by the NWDAF for the terminal device, and the registration information is generated when the NWDAF provides the first service for the terminal device.

7. A non-transitory computer-readable storage medium, storing at least one computer instruction; wherein the at least one computer instruction, when run on a computer, causes the computer to execute the method of claim 1, wherein the method comprises:
   obtaining, by a network data analytic function (NWDAF), registration information of a terminal device; and
   sending, by the NWDAF, a registration request to a unified data management (UDM); wherein the registration request comprises the registration information and location information for identifying a storage path of the registration information in the UDM, and the location information comprises an identifier of the NWDAF;
   wherein after the NWDAF sends the registration request to the UDM, the method further comprises:
   sending, by the NWDAF, an update request to the UDM in a case that the NWDAF determines that the registration information is to be updated, wherein the update request comprises updated registration information and the location information, and the update request is used for indicating the UDM to update the registration information in the storage path indicated by the location information to the updated registration information; or sending, by the NWDAF, a deletion request to the UDM in a case that the NWDAF determines that the registration information needs to be deleted, wherein the deletion request comprises the location information, and the deletion request is configured for indicating the UDM to delete the registration information in the storage path indicated by the location information.

8. A method for registering user information, comprising:
receiving, by a unified data management (UDM), a registration request from a network data analytic function (NWDAF); wherein the registration request comprises registration information of a terminal device and location information for identifying a storage path of the registration information in the UDM, and the location information comprises an identifier of the NWDAF; and
storing, by the UDM, the registration information in the storage path indicated by the location information;
wherein after receiving, by the UDM, the registration request from the NWDAF, the method further comprises:
receiving, by the UDM, an update request from the NWDAF in a case that the NWDAF determines that the registration information is to be updated, wherein the update request comprises updated registration information and the location information, and the update request is configured for indicating the UDM to update the registration information in the storage path indicated by the location information to the updated registration information; or
receiving, by the UDM, a deletion request from the NWDAF in a case that the NWDAF determines that the registration information needs to be deleted, wherein the deletion request comprises the location information, and the deletion request is configured for indicating the UDM to delete the registration information in the storage path indicated by the location information.

9. The method according to claim 8, wherein the location information is a uniform resource identifier (URI).

10. The method according to claim 8, wherein the location information further comprises an analytics identifier for an event;
wherein the analytics identifier for the event is used for indicating a first service performed by the NWDAF for the terminal device, and the registration information is generated when the NWDAF provides the first service for the terminal device.

11. The method according to claim 8, wherein after the UDM stores the registration information in the storage path indicated by the location information, the method further comprises:
receiving, by the UDM, a retrieval request from a network function (NF) consumer; wherein the retrieval request comprises an identifier of first data in the registration information and the location information; and
sending, by the UDM, the first data in the storage path indicated by the location information to the NF consumer.

12. An apparatus for registering user information, comprising:
a memory and a processor;
wherein the memory is configured to store at least one program instruction; and
the processor is configured to call the at least one program instruction stored in the memory, and execute the method of claim 8 according to an obtained program, wherein the method comprises:
receiving, by a unified data management (UDM), a registration request from a network data analytic function (NWDAF); wherein the registration request comprises registration information of a terminal device and location information for identifying a storage path of the registration information in the UDM, and the location information comprises an identifier of the NWDAF; and
storing, by the UDM, the registration information in the storage path indicated by the location information;
wherein after receiving, by the UDM, the registration request from the NWDAF, the method further comprises:
receiving, by the UDM, an update request from the NWDAF in a case that the NWDAF determines that the registration information is to be updated, wherein the update request comprises updated registration information and the location information, and the update request is configured for indicating the UDM to update the registration information in the storage path indicated by the location information to the updated registration information; or
receiving, by the UDM, a deletion request from the NWDAF in a case that the NWDAF determines that the registration information needs to be deleted, wherein the deletion request comprises the location information, and the deletion request is configured for indicating the UDM to delete the registration information in the storage path indicated by the location information.

13. The apparatus according to claim 12, wherein the location information is a uniform resource identifier (URI).

14. The apparatus according to claim 12, wherein the location information further comprises an analytics identifier for an event;
wherein the analytics identifier for the event is used for indicating a first service performed by the NWDAF for the terminal device, and the registration information is generated when the NWDAF provides the first service for the terminal device.

15. The apparatus according to claim 12, wherein the processor is configured to call the at least one program instruction stored in the memory to:
after the UDM stores the registration information in the storage path indicated by the location information, receive a retrieval request from a network function (NF) consumer;
wherein the retrieval request comprises an identifier of first data in the registration information and the location information; and
send the first data in the storage path indicated by the location information to the NF consumer.

16. A non-transitory computer-readable storage medium, storing at least one computer instruction; wherein the at least one computer instruction, when run on a computer, causes the computer to execute the method of claim 8, wherein the method comprises:
receiving, by a unified data management (UDM), a registration request from a network data analytic function (NWDAF); wherein the registration request comprises registration information of a terminal device and location information for identifying a storage path of the registration information in the UDM, and the location information comprises an identifier of the NWDAF; and
storing, by the UDM, the registration information in the storage path indicated by the location information;

wherein after receiving, by the UDM, the registration request from the NWDAF, the method further comprises:

receiving, by the UDM, an update request from the NWDAF in a case that the NWDAF determines that the registration information is to be updated, wherein the update request comprises updated registration information and the location information, and the update request is configured for indicating the UDM to update the registration information in the storage path indicated by the location information to the updated registration information; or receiving, by the UDM, a deletion request from the NWDAF in a case that the NWDAF determines that the registration information needs to be deleted, wherein the deletion request comprises the location information, and the deletion request is configured for indicating the UDM to delete the registration information in the storage path indicated by the location information.

* * * * *